(12) United States Patent
Erech et al.

(10) Patent No.: US 7,794,189 B2
(45) Date of Patent: Sep. 14, 2010

(54) CARGO FRAME

(75) Inventors: Saul Erech, Cape Coral, FL (US); Dexter J. Fowler, Bedford, PA (US)

(73) Assignee: New Enterprise Stone and Lime Company, Roaring Spring, PA (US)

( * ) Notice: Subject to any disclaimer, the term of this patent is extended or adjusted under 35 U.S.C. 154(b) by 470 days.

(21) Appl. No.: 11/552,735

(22) Filed: Oct. 25, 2006

(65) Prior Publication Data

US 2007/0092351 A1 Apr. 26, 2007

Related U.S. Application Data (60) Provisional application No. 60/729,855, filed on Oct. 25, 2005, provisional application No. 60/730,967, filed on Oct. 28, 2005.

(51) Int. Cl.
*B60P 7/08* (2006.01)
(52) U.S. Cl. .......................... 410/44; 410/46; 280/405.1
(58) Field of Classification Search .................. 410/44, 410/45, 46, 80, 156; 414/462, 812, 346, 414/350; 280/405.1; 248/688, 121
See application file for complete search history.

(56) References Cited

U.S. PATENT DOCUMENTS

| | | | |
|---|---|---|---|
| 5,567,107 A | 10/1996 | Bruno et al. | |
| 5,909,989 A | 6/1999 | Baur et al. | |
| 5,947,665 A | 9/1999 | Baur et al. | |
| 6,848,880 B2 | 2/2005 | Erech et al. | |
| 7,204,665 B2 * | 4/2007 | Heuvel et al. | 410/44 |
| 7,326,013 B2 * | 2/2008 | Heuvel et al. | 410/44 |
| 7,481,609 B2 * | 1/2009 | Abel et al. | 410/101 |
| 2003/0210965 A1 * | 11/2003 | Erech et al. | 410/2 |
| 2005/0220558 A1 * | 10/2005 | Heuvel et al. | 410/44 |
| 2007/0140804 A1 * | 6/2007 | Abel et al. | 410/44 |
| 2007/0177955 A1 * | 8/2007 | Heuvel et al. | 410/44 |

* cited by examiner

Primary Examiner—Patricia L Engle
(74) Attorney, Agent, or Firm—Pepper Hamilton LLP (57) ABSTRACT

A cargo frame may include a support arm, a cradle operable to support a corner of cargo, and a connecting element. The support arm may be supported by a base. The support arm may be extendible and include a lower support arm and an upper support arm. The connecting element may removably attach the lower support arm to the upper support arm at a connection point of the lower support arm and one of a plurality of connection points of the upper support arm. The cradle may be rotatably and removably attached to the support arm at one of one or more connection points. The cradle may be rotatable from an unloaded position to a loaded position.

20 Claims, 7 Drawing Sheets

CARGO FRAME

CLAIM OF PRIORITY AND RELATED APPLICATIONS

This application claims priority to pending U.S. Provisional Application Ser. No. 60/729,855, entitled "Cargo Frame" and filed Oct. 25, 2005, and pending U.S. Provisional Application Ser. No. 60/730,967, entitled "Cargo Frame" and filed Oct. 28, 2005, which is incorporated herein by reference in its entirety.

BACKGROUND

1. Technical Field

The disclosed embodiments relate generally to a frame for supporting cargo of a plurality of lengths and widths in an inclined position during transport by road, rail, water or other means in order to decrease the apparent width of the cargo. More particularly, the disclosed embodiments relate to a frame having a rotatable head on a mounted arm for supporting the cargo.

2. Background

Prior art tiltable cargo racks for supporting large pre-cast concrete structures had a longitudinal arm rotatable from a horizontal loading position to an inclined transport position. In such prior cargo racks, a plurality of upwardly extending members of specified length was required for simultaneously contacting and supporting respective corners of the structure. Adequate support was not provided in the event that the pre-cast concrete structure had one or more corners at a height differing from the length of one or more of the corresponding upwardly extending members of the rack.

Accordingly, it is desirable to provide a tiltable cargo rack that provides adequate support for the cargo without requiring a plurality of upwardly extending members of specified length for simultaneously contacting and supporting respective corners of the cargo.

It is also desirable to provide a tiltable cargo rack that provides support to cargo at a location that is intended to be supported and helps to protect the cargo from damage.

It is further desirable that the cargo rack supports double tee cargo of varying length, varying stem height and varying width.

The present disclosure is directed towards solving one or more of these problems.

SUMMARY

Before the present methods and systems are described, it is to be understood that this invention is not limited to the particular methodologies and systems described, as these may vary. It is also to be understood that the terminology used in the description is for the purpose of describing the particular versions or embodiments only, and is not intended to limit the scope of the invention.

It must also be noted that as used herein and in the appended embodiments, the singular forms "a," "an," and "the" include plural references unless the context clearly dictates otherwise. Thus, for example, reference to a "base" is a reference to one or more bases and equivalents thereof known to those skilled in the art, and so forth. Unless defined otherwise, all technical and scientific items used herein have the same meanings as commonly understood by one of ordinary skill in the art. Although any methods and systems similar or equivalent to those described herein can be used in the practice or testing of embodiments of the invention, the preferred methods and devices are now described. All publications mentioned herein are incorporated by reference. Nothing herein is to be construed as an admission that the invention is not entitled to antedate such disclosure by virtue of prior invention.

The present cargo frame securely retains the cargo in position during transport without requiring a plurality of upwardly extending members of specified length for simultaneously contacting and supporting respective corners of the cargo.

The above and other features and advantages are achieved through the use of a novel cargo frame as herein disclosed. In an embodiment, a cargo frame may include an extendable support arm including a lower support arm and an upper support arm, supported by a base, a cradle operable to support a corner of cargo and rotatably attached to the extendable support arm, and a first connecting element. The first connecting element may removably attach the lower support arm to the upper support arm at a connection point of the lower support arm and one of a plurality of connection points of the upper support arm.

In an embodiment, a cargo frame may include a support arm, a cradle operable to support cargo, and a first connecting element. The cradle may be rotatably attached to the support arm using the first connecting element. The first connecting element may removably attach the support arm to the cradle at a connection point of the support arm and one of a plurality of connection points of the cradle. The cradle may be rotatable from an unloaded position to a loaded position. The rotatable cradle may have, for example, two swivel points enabling the center of gravity of cargo having different widths to be closer to the midpoint of the axle of a motor vehicle. As such, the cargo may be more stable during transport. In other words, the rotatable cradle may be hinged in a first position in order to place the center of gravity for first loaded cargo having a first width near the midpoint of the axle of a motor vehicle and may be hinged in a second position in order to place the center of gravity for second loaded cargo having a second width near the midpoint of the axle.

BRIEF DESCRIPTION OF THE DRAWINGS

The accompanying drawings, which are incorporated in and form a part of the specification, illustrate various embodiments and, together with the description, serve to explain the principles of the various embodiments.

DETAILED DESCRIPTION

An embodiment provides a cargo frame having a selectively rotatable cradle removably attached to a supporting arm and one or more receiving bases operable to support cargo. The rotatable cradle may include an extendable assembly that extends to contact and support a corner of a first leg of the cargo. A receiving base may provide support to a second leg of the cargo. Optionally, at least one receiving base may include an extendable assembly for providing lateral support to the second leg of the cargo.

Figure 1:
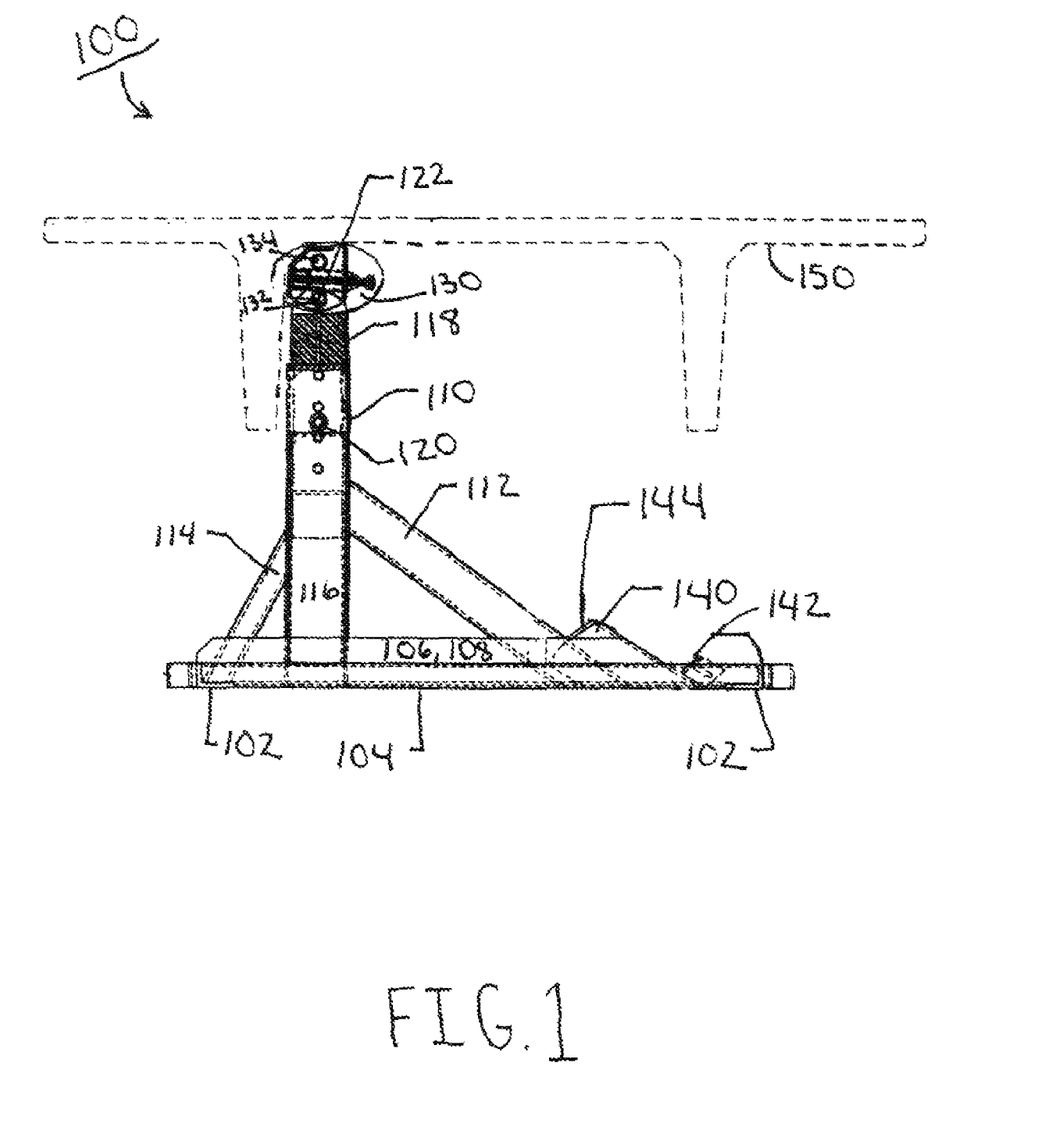
FIG. 1 illustrates a side view of an exemplary cargo frame according to an embodiment.

FIG. 1 illustrates a side view of an exemplary cargo frame according to an embodiment. Referring to FIG. 1, cargo frame 100 may include a base which, for example, includes spaced steel angle irons 102 and one or more spaced cross plates, such as 104, and/or one or more angle braces, such as 106 and 108. In an embodiment, the base may be integral with or part of a frame or bed of a vehicle. A preferably substantially vertical support arm, which, for example, may include a lower support arm 110, may be welded, bolted or otherwise secured to one or more corresponding spaced angle braces 106 and/or 108 and/or one or more diagonal support beams, such as 112, 114 and 116, on one or more sides. The support arm may further include an upper support arm 118, which may extend from and may be removably attached to the lower support arm 110 by a first connecting element 120, such as a pin. The first connecting element 120 may be, for example, inserted through one of a plurality of holes drilled through the upper support arm 118. For example, the first connecting element 120 may removably attach the lower support arm 110 to the upper support arm 118 in a first connection orientation if the cargo has a first width and removably attach the lower support arm to the upper support arm in a second connection orientation if the cargo has a second width. In an embodiment each connection orientation between the lower support arm 110 and the upper support arm 118 may be achieved by aligning connection points, such as holes, locations within a slidable assembly, notches and/or the like, on the two support arms and applying the first connecting element 120 to removably affix the relative position of the support arms.

Upper support arm 118 may also be removably attached to a cradle 130, for example, through one of a lower hole 132 (i.e., a first connection point) and an upper hole 134 (i.e., a second connection point). A second connecting element 122, such as a second pin, may be inserted through an upper hole in upper support arm 118 and one of lower hole 132 and upper hole 134 in the cradle. As depicted in FIG. 1, the second connecting element 122 may be inserted through lower hole 132. Inserting the second connecting element 122 through the lower hole 132 or the upper hole 134 may depend, for example, upon the dimensions of the supported cargo (such as 150). For example, the second connecting element 122 may be inserted in the lower hole 132 for cargo 150 having a relatively short width, such as a 12-foot double tee structure. Alternately, the second connecting element 122 may be inserted in the upper hole 134 for cargo having a relatively long width, such as a 15-foot double tee structure. The selection of the hole 132, 134 in which to place the second connecting element 122 may be determined based upon the location of the center of gravity of the cargo 150 when the cargo is placed in a loaded position. In an embodiment, the selected hole may place the center of gravity of the cargo 150 nearer to a midpoint of an axle of a motor vehicle on which the cargo is loaded when the cradle 130 supports the cargo in a loaded position. Alternate placements and alternate structures, including, those having different sizes, may also be encompassed within the scope of this disclosure as will be apparent to one of ordinary skill in the art. In addition, alternate methods of adjusting the position of the cradle 130 relative to the upper support arm 118, such as a notch, a slidable assembly and any other means of rotatably securing the cradle and the upper support arm in a position relative to each other known to those of ordinary skill in the art.

Figure 2:
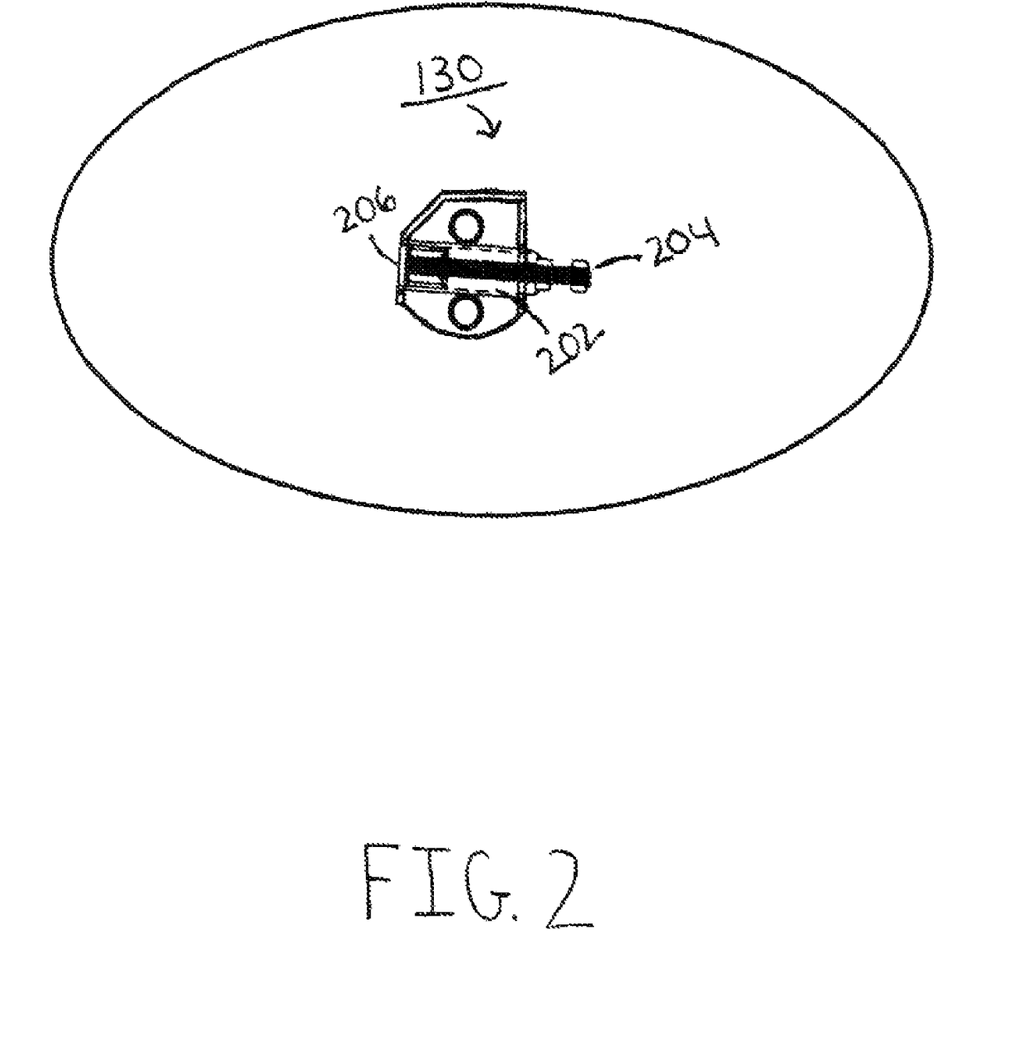
FIG. 2 depicts an exemplary cradle, including an exemplary extendable bolt assembly, according to an embodiment.
Figure 3:
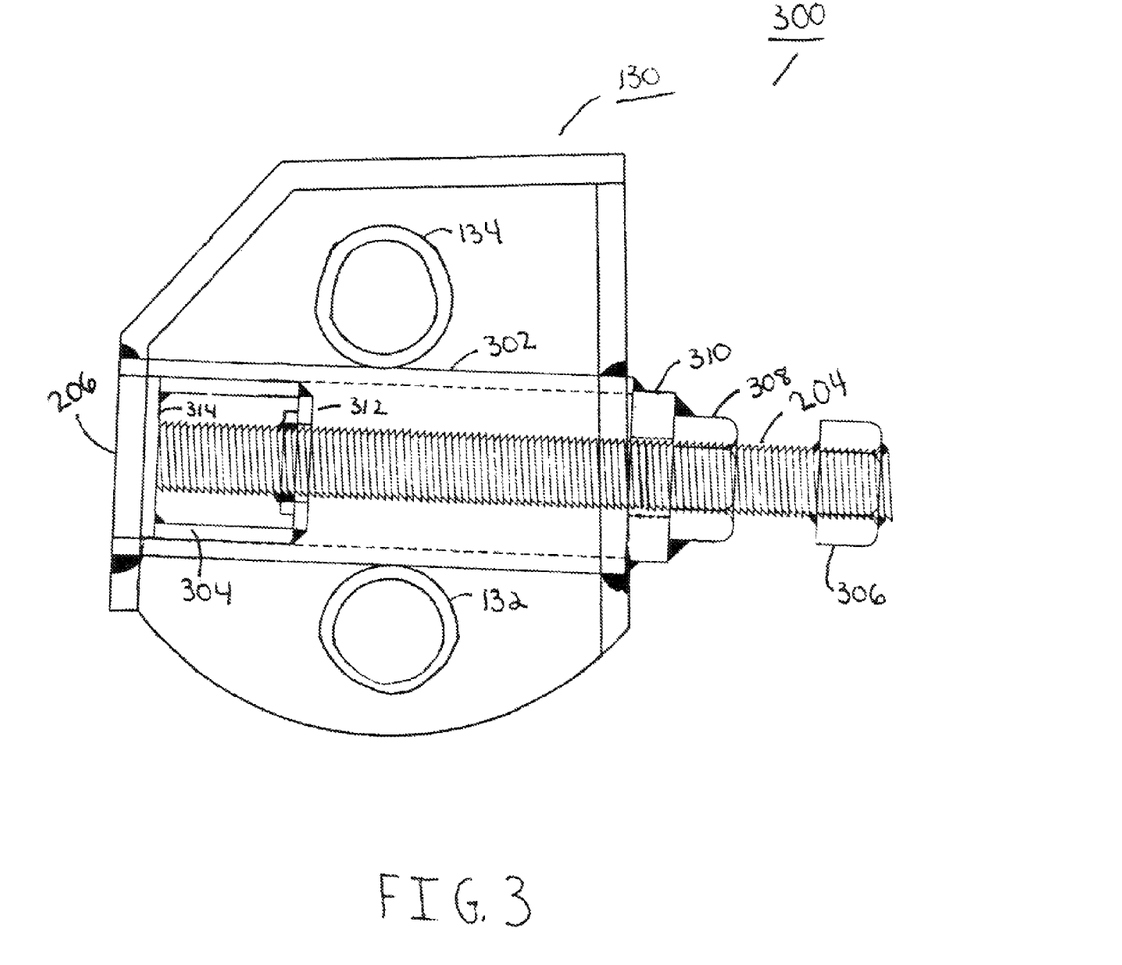
FIG. 3 depicts a side view of the extendable bolt assembly of FIG. 2 according to an embodiment.

FIG. 2 depicts an exemplary cradle according to an embodiment. Cradle 130 may be shaped to abut a corresponding corner of cargo (such as 150 in FIG. 1). Sleeve 202, mounted transversely in the cradle 130, may receive bolt assembly 204 which may be turned to adjust its position, for example, to a retracted position (to the right in FIG. 2) out of contact with a downwardly extending leg of the cargo 150. Alternately, the bolt 204 may be turned and adjusted to an extended position (to the left in FIG. 2) to contact and support the leg of the cargo 150. A pressure plate 206 may be attached or secured to the end of the bolt 204 for contact with the leg of the cargo 150 in order to spread the force for support of the leg over a greater area. Alternatively, as shown in FIG. 3 and as described below, the bolt assembly 204 may be included in a sleeve device that extends to contact and support the leg of the cargo 150. In alternate embodiments, the bolt assembly 204 may be a threaded rod or other appropriate item.

FIG. 3 provides a magnified view of the extendable bolt assembly 300, which may be included in a sleeve device that extends to contact and support a leg of the cargo. Referring to FIG. 3, the cradle 130 may be equipped with an outer sleeve 302 and an inner sleeve 304, each of which may be, for example, a metal pipe or other cylinder or other-shaped sleeve. In an embodiment, an inner diameter of the outer sleeve 302 may be larger than an outer diameter of the inner sleeve 304. For example, in one embodiment the inner diameter of the outer sleeve 302 may be approximately 2.9 inches, and the outer diameter of the inner sleeve 304 may be approximately 2.875 inches. However, other sizes and shapes for the outer sleeve 302 and the inner sleeve 304 are possible. The outer sleeve 302 may be attached to the cradle 130, such as by welding. In an alternate embodiment, the outer sleeve 302 may be integral with the cradle 130. In an embodiment, the inner sleeve 304 may not be attached to the outer sleeve 302. In an embodiment, the inner sleeve 304 may be shorter than the outer sleeve 302 to enable the inner sleeve to move within and be retracted into the outer sleeve.

The bolt assembly 204 may extend into the outer sleeve 302 and the inner sleeve 304 and may be longer than either the inner sleeve or the outer sleeve. A first nut 306 or other gripping means may be attached, such as by welding, at or near a first end of the bolt 204 to provide a secure gripping point for turning the bolt. Alternatively, if bolt 204 has an integral head or other grippable element, the first nut 306 may not be used. A second nut 308 and an optional washer 310 may be fixedly attached, such as by welding, to the outer sleeve 302 or the cradle 130 to provide further stability outside of the outer sleeve. One or more washers, such as 312 and 314, may also be secured, such as by welding, to the inner sleeve 304 and/or to each other to receive the bolt 204 and provide further stability. A plate 206 or washer may be positioned at a second end of the bolt 204. In an embodiment, the plate 206 may be secured to the second end of the bolt 204. The plate 206 may contact and/or press against the downwardly extending leg of the cargo 150 when the bolt 204 is adjusted so that the plate 206 extends outside of the inner sleeve 304 and the outer sleeve 302.

When the cargo 150 is loaded onto the cargo frame, the bolt 204 may be in a retracted position. After the cargo 150 is placed onto the assembly, the bolt 204 may be adjusted so that the plate 206 protrudes from the outer sleeve 302 and the inner sleeve 304. Thus, the plate 206 and its related elements in the bolt assembly 204 may provide additional support and bracing of the cargo 150 when the cargo is placed in a loaded position, such as the position shown in FIG. 4.

Figure 5A:
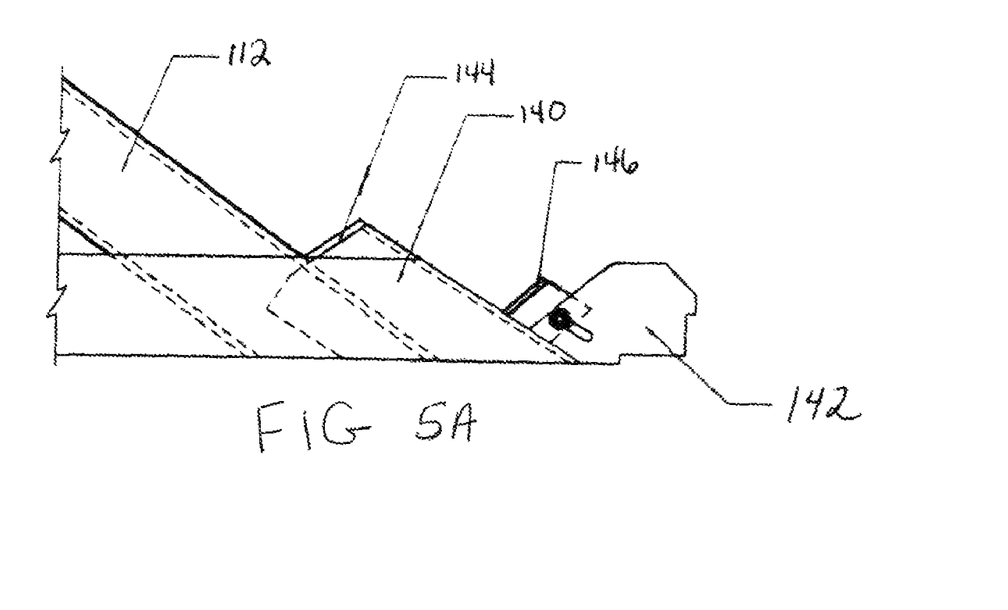
FIGS. 5A and 5B depict an exemplary extendable assembly for a receiving base according to an embodiment.
Figure 5B:
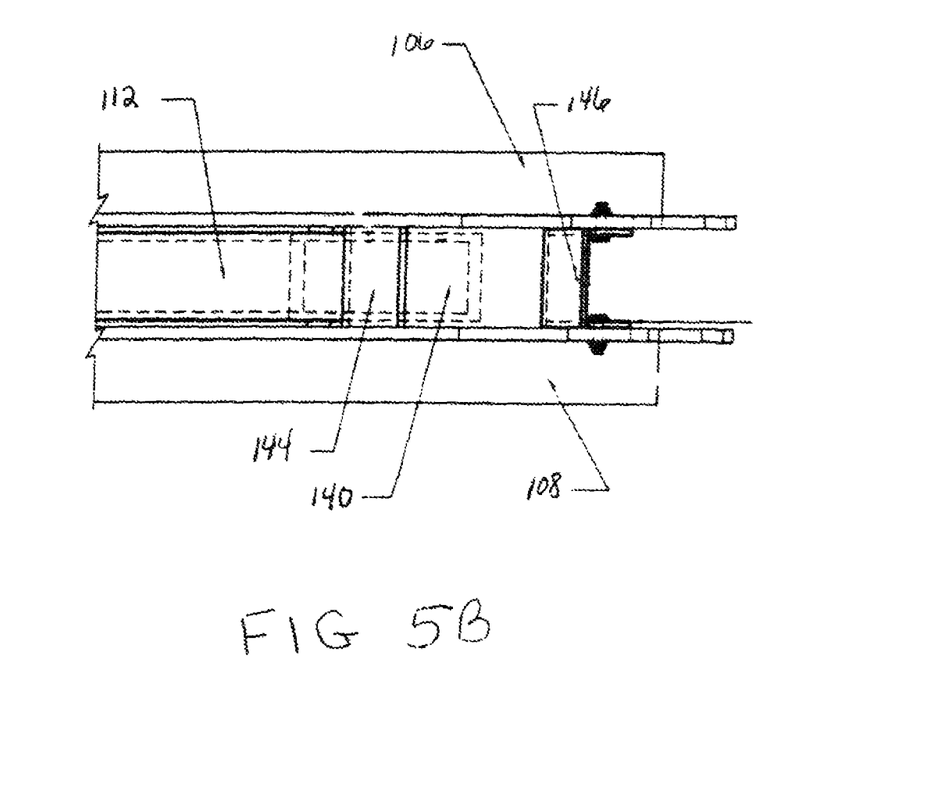

Referring back to FIG. 1, the cargo frame may include one or more receiving bases, such as 140, for supporting the cargo 150 when it is in a transport position. The bases may be mounted along support beam 112 as shown in FIG. 1, or they may be raised to support any location along the stem of the cargo. Alternatively, the cargo frame may be mounted directly on a truck trailer or other vehicle so that the vehicle serves as the base. Alternately, support beam 112 may serve as a base for some embodiments. In one embodiment, support beam 112 may serve as a first receiving base to receive cargo of a first width, such as 12 feet or 15 feet. In an embodiment, the second connecting element 122 may be inserted through the lower hole 132 of the cradle 130 for cargo of a shorter width. As shown in FIGS. 5A and 5B, a pad 144, which may be made of rubber, plastic, wood, metal or any other suitable material, may be used to abut the cargo 150 adjacent to a second receiving base 140. However, pad 144 is optional, and in various embodiments neither pad 144 nor second base 140 may touch the stem of the cargo 150.

In an embodiment, for double-tee cargo 150 having a width of approximately twelve feet, the angle of incline may be between about thirty and about forty degrees. In an embodiment, for double-tee cargo 150 having a width of approximately twelve feet, the angle of incline may be approximately thirty-five degrees. However, other angles are possible.

Figure 4:
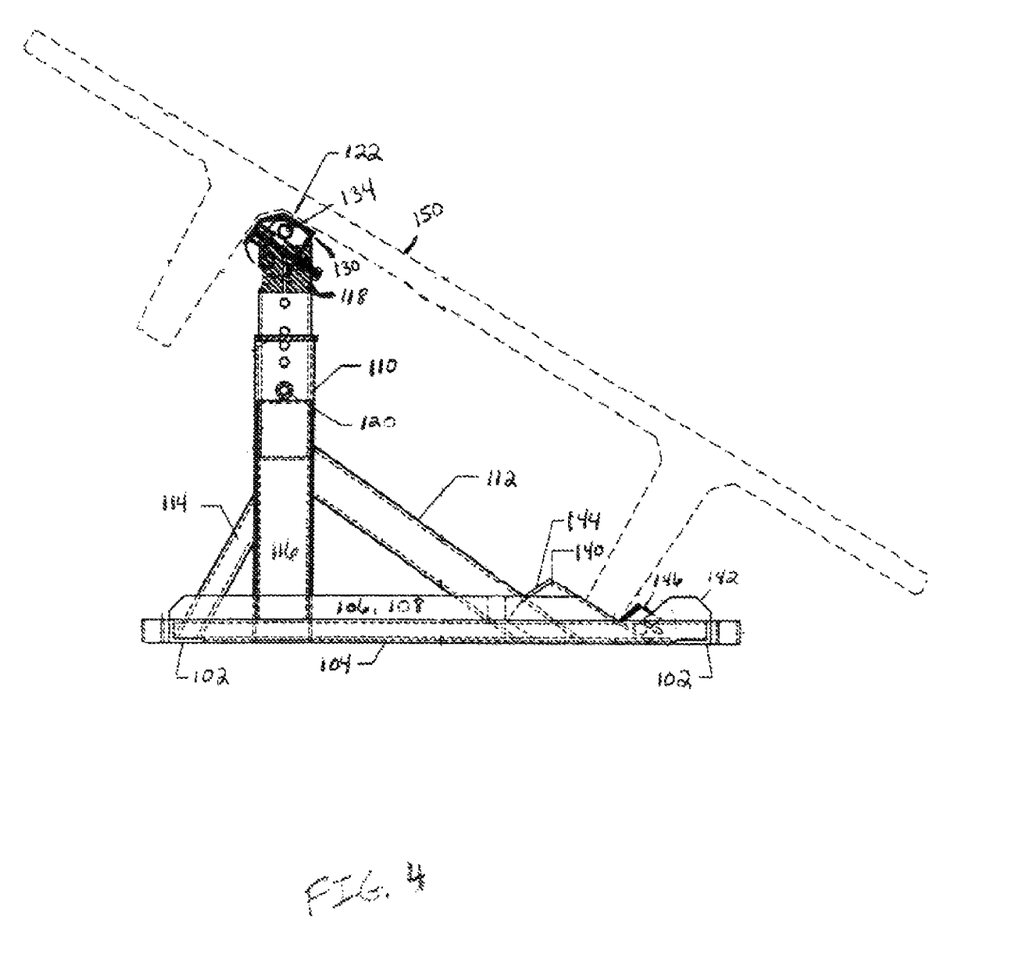
FIG. 4 illustrates a side view of an exemplary cargo frame in a transport position according to an embodiment.

As shown in FIG. 4, a second receiving base 140 may be designed to receive cargo of a wider width, such as fifteen feet. In an embodiment, the second connecting element 122 may be inserted through the upper hole 134 of the cradle 130 for cargo of the wider width. The stem of the double tee may then rest on base 140 when in a loaded position. Optionally, the first receiving base and second receiving base may be formed of a single, multi-level member.

Optionally, an extendable assembly 146 may be extended to abut the cargo 150 adjacent to a stop member 142, if needed based on the width of the cargo. FIGS. 5A and 5B depict the components of an extendable assembly 146 according to an embodiment. The extendable assembly 146 may be attached to angle braces 106 and 108 using, for example, bolts. The extendable assembly 146 may be positioned, for example, in an extended position, a retracted position or an intermediate position. In an embodiment, the width of the leg of the cargo 150 may be such that the extendable assembly 146 is in a retracted position when the cargo 150 is received. Such an embodiment is shown in FIG. 1. Optionally, receiving base 140 may also include an extendable assembly for use when the double tee rests on support beam 112. However, it should be noted that in some embodiments second base 140 and pad 144 may not contact the cargo when the cargo rests on support beam 112.

In an embodiment, for double-tee cargo 150 having a width of approximately fifteen feet, the angle of incline may be between about twenty-five and about thirty-five degrees. In an embodiment, for double-tee cargo 150 having a width of approximately fifteen feet, the angle of incline may be approximately thirty-one degrees. However, other angles are possible.

Figure 6:
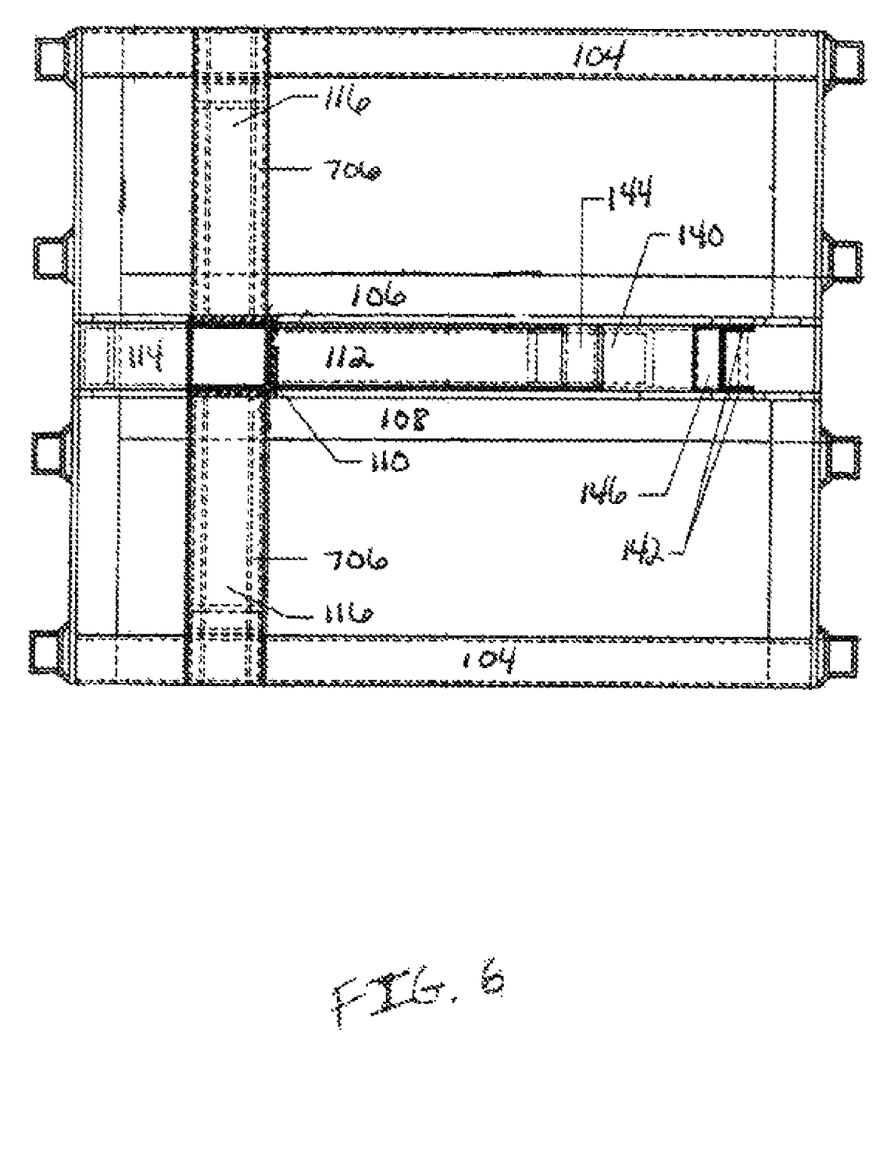
FIG. 6 depicts a top view of an exemplary cargo frame according to an embodiment.

FIG. 6 depicts a top view of an exemplary cargo frame according to an embodiment. As shown in FIG. 6, the lower support arm 110 may be supported by one or more support beams, such as 112, 114, and 116. Support beams 116 may be attached, such as by welding, to a cross plate 104. In an embodiment, cross plate 104 and angle braces 106 and 108 may be aligned such that they are substantially parallel to the axles of a motor vehicle on which the cargo frame is placed.

Figure 7:
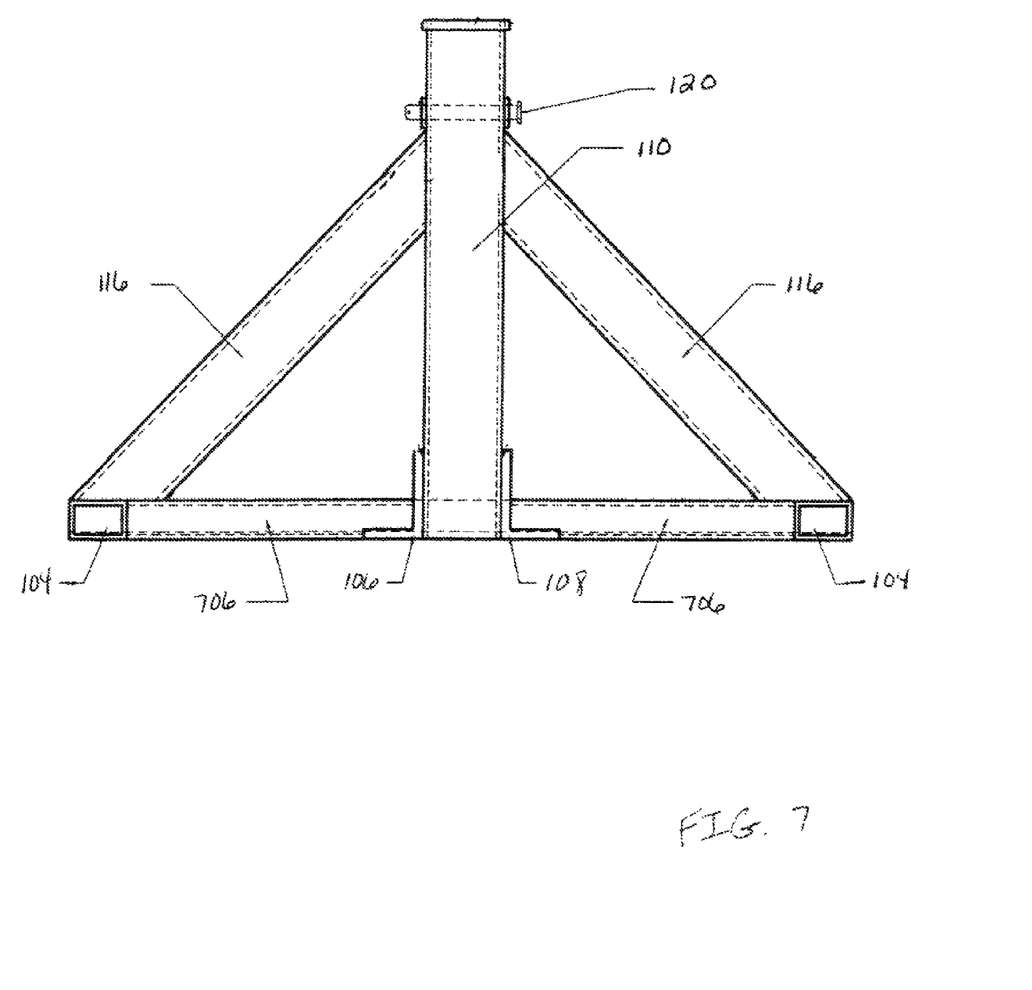
FIG. 7 depicts a side view of the exemplary cargo frame according to an embodiment.

FIG. 7 depicts a cross-sectional view of an exemplary cargo frame according to an embodiment. As shown in FIG. 7, the lower support arm 110 may be supported by support beams 116 as mentioned above. In an embodiment, each support beam 116 may be welded to the lower support arm 110. In addition, angle braces 106 and 108 may be welded to the base of the lower support arm 110 to provide further support. In an embodiment, each support beam 116 may be further welded to a lower support tube 706.

In various embodiments cargo may be loaded on the rack using a crane or other lifting device, so that the cargo is lowered onto the rack as shown in FIG. 1. When the cargo contacts the cradle 130, the cargo is lowered so that it rotates with the cradle, and a lower portion of the cargo touches a base (such as 112 or 140) as shown in FIG. 4. Optionally, two cranes may be used so that a first crane can lower a portion of the cargo onto the cradle while a second crane can lower another portion of the cargo onto the arm or base. Also optionally, the cargo may be further secured to the base, rack, vehicle or other structure using any suitable tie-down or clamping device, such as one or more chains or clamps.

It is to be understood that the invention is not limited in its application to the details of construction and to the arrangements of the components set forth in this description or illustrated in the drawings The disclosed method and system are capable of other embodiments and of being practiced and carried out in various ways. Hence, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosed embodiments. It is important, therefore, that the embodiments included below be regarded as including such equivalent constructions insofar as they do not depart from the spirit and scope of the disclosed embodiments.

What is claimed is:

1. A cargo frame, comprising:
a base;
an extendable support arm supported by the base, wherein the extendable support arm comprises a lower support arm and an upper support arm;
a first connecting element, that removably attaches the lower support arm to the upper support arm at a connection point of the lower support arm and one of a plurality of connection points of the upper support arm; and
a cradle rotatably attached to the upper support arm, the cradle comprising a sleeve that receives a bolt assembly, the cradle operable to support a corner of cargo and shaped to abut the corner, and the bolt assembly being adjustable to an extended position that contacts and supports a leg of cargo.

2. The cargo frame of claim 1, further comprising:
a plurality of receiving bases,
wherein each receiving base is supported by the base and operable to support a leg of the cargo,
wherein the cradle is rotatable from an unloaded position to a loaded position, and
wherein one of the receiving bases supports the cargo when the cradle is in the loaded position.

3. The cargo frame of claim 1, wherein the bolt assembly comprises a pressure plate secured to an end of the bolt assembly and which contacts the leg of the cargo.

4. The cargo frame of claim wherein the sleeve comprises an inner sleeve and an outer sleeve, the inner sleeve being shorter than the outer sleeve and supporting the bolt inside of the outer sleeve.

5. The cargo frame of claim 1 wherein:
the first connecting element removably attaches the upper support arm to the lower support arm in a first position if the cargo has a first width; and
the first connecting element removably attaches the upper support arm to the lower support arm in a second position if the cargo has a second width.

6. The cargo frame of claim 1, further comprising:
a second connecting element,
wherein the cradle is removably attached to the extendable support arm using the second connecting element at one of a plurality of connection points,
wherein a connection point for removably attaching the cradle to the extendable support arm is determined based on the center of gravity of the cargo when the cradle supports the cargo in a loaded position.

7. The cargo frame of claim 6 wherein:
the second connecting element removably attaches the upper support arm to the cradle via a first connection point of the cradle if the cargo has a first width; and
the second connecting element removably attaches the upper support arm to the cradle via a second connection point of the cradle if the cargo has a second width.

8. The cargo frame of claim 1 wherein the cargo frame supports only one corner of the cargo.

9. The cargo frame of claim 8 wherein the cradle supports the corner of the cargo.

10. A cargo frame, comprising:
a support arm;
a cradle rotatably attached to the upper support arm, the cradle comprising a sleeve that receives a bolt assembly, the cradle operable to support cargo and shaped to abut a corner of the cargo, and the bolt assembly being adjustable to an extended position that contacts and supports a leg of cargo, wherein the cradle comprises a plurality of connection points, wherein each connection point is configured to connect the cradle to the support arm; and
a first connecting element,
wherein the cradle is rotatably attached to the support arm using the first connecting element,
wherein the first connecting element removably attaches the support arm to the cradle at a connection point of the support arm and one of the plurality of connection points of the cradle, and
wherein the cradle is rotatable from an unloaded position to a loaded position.

11. The cargo frame of claim 10, further comprising:
a plurality of receiving bases,
wherein each receiving base is operable to support cargo, and
wherein one receiving base supports cargo when the cradle is in the loaded position.

12. The cargo frame of claim 10 wherein the bolt assembly comprises a pressure plate secured to an end of the bolt assembly and which contacts the leg of the cargo.

13. The cargo frame of claim 10 wherein the support arm is extendable.

14. The cargo frame of claim 13 wherein the extendable support arm comprises:
an inner support arm;
an outer support arm; and
a second connecting element that is operable to removably attach the inner support arm to the outer support arm.

15. The cargo frame of claim 14 wherein:
the second connecting element removably attaches the inner support arm to the outer support arm in a first position if the cargo has a first width; and
the second connecting element removably attaches the inner support arm to the outer support arm in a second position if the cargo has a second width.

16. The cargo frame of claim 10 wherein:
the first connecting element removably attaches the support arm to the cradle via a first connection point of the non-cylindrical cradle if the cargo has a first width, and
the first connecting element removably attaches the support arm to the cradle via a second connection point of the non-cylindrical cradle if the cargo has a second width.

17. The cargo frame of claim 10 wherein the connection point for removably attaching the cradle to the extendable support arm is determined based on the center of gravity of the cargo when the cradle supports the cargo in a loaded position.

18. The cargo frame of claim 10, wherein the sleeve comprises an inner sleeve and an outer sleeve, the inner sleeve being shorter than the outer sleeve and supporting the bolt inside of the outer sleeve.

19. The cargo frame of claim 10 wherein the cargo frame supports only one corner of the cargo.

20. The cargo frame of claim 19 wherein the cradle supports the corner of the cargo.

* * * * *